Dec. 23, 1958

J. P. ECKERT, JR 2,866,105

TRANSISTOR LOGICAL DEVICE

Filed Oct. 4, 1955

INVENTOR
JOHN PRESPER ECKERT, JR.

BY Charles C. English

AGENT

United States Patent Office 2,866,105

Patented Dec. 23, 1958

2,866,105

TRANSISTOR LOGICAL DEVICE

John Presper Eckert, Jr., Philadelphia, Pa., assignor to Sperry Rand Corporation, New York, N. Y., a corporation of Delaware Application October 4, 1955, Serial No. 538,318

5 Claims. (Cl. 307—88.5)

The present invention relates to logical devices or amplifier structures, and is more particularly concerned with such devices and structures utilizing in their operation the charge carrier storage phenomenon or enhancement charge storage phenomenon normally present in semiconductor devices such as transistors. In this respect the present invention utilizes such phenomena, heretofore considered undesirable characteristics of transistors, in the provision of a simplified transistor amplifier having improved operating characteristics.

Transistor circuits have in the past exhibited what may be termed a charge carrier storage or an enhancement charge phenomenon. The phenomenon is characterized by the fact that if output current should be established in a transistor device and the input current should then suddently be decreased, the output current will not immediately decrease but will continue to flow in the output mesh of the network due to the presence of enhancement charge. This continued flow of current, termed "enhancement current," subsequent to decrease or removal of an input signal, arises by reason of the storage of excess holes or electrons in the lattice structure of the solid state material comprising the amplifier, whereupon a certain finite time is required for such excess holes or electrons to be "cleaned up" in the amplifier, subsequent to decrease or removal of an input signal.

The present invention relates to a circuit utilizing the enhancement phenomenon discussed above, and is distinguished from the circuit described above by the provision of spaced power pulses in the output mesh of the transistor amplifier for keying a load into and out of the said output mesh. When such a keying operation is employed in accordance with the present invention, the output pulse width can be made either of the same length or of a length different from the input pulse, and the actual time length of the output pulse is determined and limited by the width of power pulse employed for selectively keying the load. The enhancement charge phenomenon is used in accordance with the present invention by causing an input pulse to sufficiently charge the transistor so that it will support load current even though the said input pulse should be decreasing in amplitude.

In one preferred embodiment of the present invention, the output load may be disconnected from the transistor during a time period equal to or less than an entire first half cycle of input current, and the load may thereafter be keyed into the circuit during the last half cycle of input signal whereby the load current comprises substantial transistor enhancement current. By such an arrangement it is permissible to have had as long an input rise time as one half cycle without affecting the rise time of the current and voltage throughout the load, inasmuch as the rise time of the signal at the circuit input is not reflected at the load due to the load keying by the said power pulse or clock pulse source. Such an operating characteristic further results in a circuit repetition rate which may be equal, for instance, to about one half the α cut-off of the transistor since a whole half period is left for the charging of the transistor, and due to the additional time allowed for hole diffusion in the transistor when it is operated in accordance with this one embodiment of the present invention, the current gain of the transistor is increased substantially.

It should further be noted that by utilizing the pulse type operation of the present invention, comprising for instance a transistor having a pulsed collector, no holes are removed through the said collector until the load is actually pulsed. Thus, by utilizing the pulsed collector operation to be described, higher current gains are achieved in the circuit even if the same turn-on times are allowed for pulsed and non-pulsed operation. The described operating characteristics utilizing enhancement of the transistor amplifier thus permit a substantial increase in amplifier gain, and in addition enable the transistor amplifier to work with square waves very close to the α cut-off of the said transistor.

The above mentioned keying or pulse-type operation may be utilized in accordance with a further form of the present invention in the provision of an improved logical element such as a complementing amplifier. In this respect it should be noted that complementers have in the past assumed relatively complex structures and have often exhibited inferior gain as well as other undesirable characteristics. The present invention serves to obviate this former complexity and undesirable operation through the utilization of inverting amplifiers, of which transistors are one type, as selective clamps. Such inverting amplifiers may be coupled to a pulsing source via a load whereby, in the absence of a signal input to the inverting amplifier, the pulse source effects corresponding pulse outputs to the load, while the application of a signal input causes the normally inverting amplifier to maintain an output point at a predetermined potential notwithstanding the presence of pulses from the said pulse source. In this respect, therefore, the present invention again relies upon the novel concept of providing a pulse type energization source for inverting amplifiers, such as transistors, whereby the said inverting amplifier acts as a complementer.

This latter form of the present invention may be accomplished, as before, by utilizing a transistor having a source of selective input pulses coupled to one terminal thereof, having a load impedance coupled to another terminal thereof, and having the said load returned to a source of regularly occurring clock or power pulses. In the operation of this particular embodiment of the present invention, no output can be achieved across the load in the absence of a power pulse applied to the said load; while the application of such a power pulse effects a desired output across the load. The application of a signal input to the transistor, or to whatever other form of inverting amplifier might be employed, maintains the output point at a predetermined output potential notwithstanding the presence of a power pulse. This operation, of course, conforms to the desired output characteristics of known complementers whereby such a complementer may be effected more simply than has been the case in the past.

It is accordingly an object of the present invention to provide an improved semiconductor amplifier.

A further object of the present invention resides in the provision of a transistor amplifier wherein the load is selectively keyed into and out of the circuit.

A still further object of the present invention resides in the provision of a transistor amplifier utilizing enhancement for increasing the gain of the said amplifier.

Still another object of the present invention resides in the provision of a transistor amplifier capable of operating very close to the α cut-off of the said transistor.

A still further object of the present invention resides in the provision of a transistor amplifier capable of employing a lower $\alpha$ cut-off transistor for a given frequency of operation.

A still further object of the present invention resides in the provision of a transistor amplifier having a selectively keyed load whereby the frequency response of the overall system is improved.

Still another object of the present invention resides in the provision of a transistor amplifier capable of operation as a delay element.

A further object of the present invention resides in the provision of improved logical elements for use in computation devices.

A still further object of the present invention resides in the provision of improved inverting amplifier circuits whereby the said inverting amplifiers act as pulse type complementing amplifiers.

Another object of the present invention resides in the provision of improved complementers for use in logical structures.

Still another object of the present invention resides in the provision of logical elements which are relatively simple in construction and which may be made in relatively small sizes.

A further object of the present invention resides in the provision of transistor amplifiers and complementing amplifiers having better operating characteristics than has been the case heretofore.

The foregoing objects, advantages, construction and operation of the present invention will become more readily apparent from the following description and accompanying drawings, in which:

Figure 1D is a schematic diagram of another variation of Figure 1 which includes a third type of collector return circuit.

Figures 1, 1A, 1B, 1C, 2, 3:
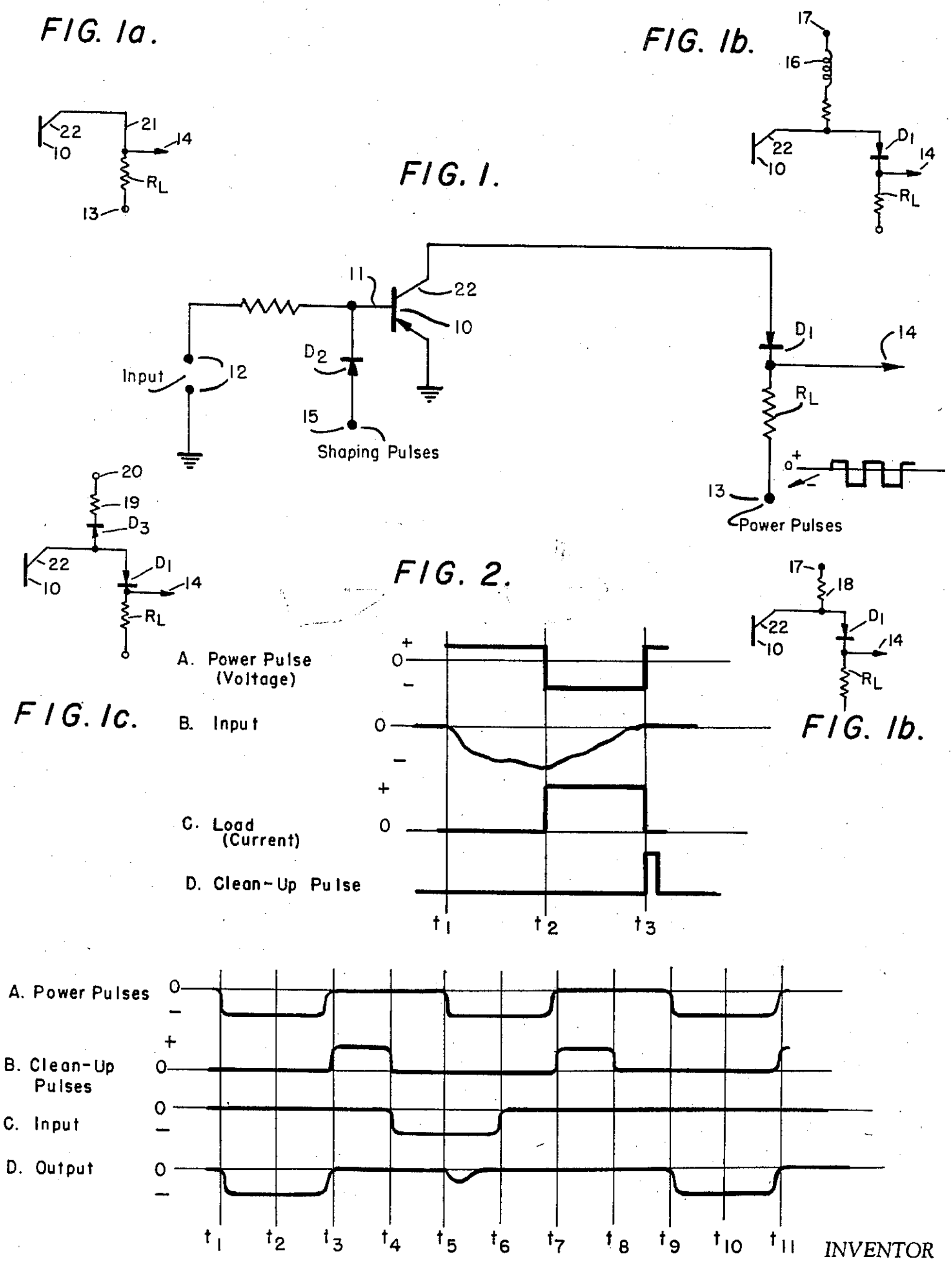
Figure 1 is a schematic diagram of a transistor amplifier constructed in accordance with one embodiment of the present invention.
Figure 1A is a schematic diagram of one variation of the amplifier of Figure 1.
Figure 1B is a schematic diagram of another variation of the amplifier of Figure 1 which includes a return circuit for the collector.
Figure 1C is a schematic diagram of another variation of the amplifier of Figure 1 which includes a second type of collector return circuit.
Figure 2 (A through D) are waveform diagrams illustrating one possible mode of operation of the circuit shown in Figure 1.
Figure 3 (A through D) are waveform diagrams illustrating another possible mode of operation of a modified circuit of the type shown in Figure 1.

Referring now to Figure 1, it will be seen that, in accordance with the present invention, an improved transistor amplifier may comprise a transistor 10 having its emitter grounded and having its base 11 coupled to a source of input pulses appearing at terminals 12. The collector 22 of the said transistor 10 may be coupled via a rectifier D1 to one end of a load $R_L$, and the other end of the said load $R_L$ may in turn be coupled to a source 13 of regularly occurring positive and negative-going power pulses, whereby outputs may be taken selectively at an output terminal 14. A source of shaping or clean-up pulses 15 (Figure 2D), may be coupled to one or more electrodes of the transistor 10, for instance by a rectifier D2.

In the particular example of the present invention, illustrated in Figure 1, a PNP transistor in a grounded emitter connection has been employed. It must be understood that the concepts to be described find application in other amplifier arrangements, however, and in particular, both PNP and NPN type transistors may be employed. Further, the transistors to be employed may be of both the junction and point contact types; and these transistors may be connected in grounded base or grounded collector connections, as well as the illustrated grounded emitter connection. It should further be appreciated that while the source 15 of shaping pulses has been illustrated as selectively coupled to the transistor base, such shaping pulses may be coupled to the emitter or collector of the transistor, or to plural electrodes of the transistor in a known manner; and such alternative circuit configurations are meant to be embodied in the generic illustration of Figure 1.

In the operation of the circuit, an input pulse may be applied to terminals 12, whereby carriers are injected into the lattice structure of the semiconductor material comprising transistor 10. During a preliminary time period, the load $R_L$ is disconnected from the transistor 10 under the control of clock pulses or power pulses supplied by source 13, thereby to provide an initial time period for the charging of transistor 10. This preliminary charge period may, for instance, comprise up to one half of the time allocated to the input signal and, due to the fact that the load is not connected to the transistor during this initial period, the input signal may in fact exhibit a rise time extending over such an initial one half cycle without this rise in signal being reflected at the load.

Subsequent to the initial charge period described, the load is keyed into the circuit whereby the output current of the load rises rapidly, and this output current and load is maintained at a substantially constant value, even though the input signal should be decreasing in magnitude, due to the flow of previously charged holes or electrons. The circuit parameters are preferably so chosen that the stored enhancement charge is substantially entirely drawn from the transistor during the time interval that the load is keyed into the circuit, and subsequent to this output time period, the load is once more disconnected from the circuit whereby the output current and voltage fall rapidly.

It will be appreciated that the time during which output current actually flows through the load is dependent upon the width of the clock pulse or power pulse utilized for keying the load and that this output time may be made either the same or different in length from the time of the input pulse. It will be further appreciated that due to the keying of the load at a time subsequent to commencement of an input signal, the circuit exhibits a short time delay whereby a delay in the signal path may be effected without the use of auxiliary delay lines.

To summarize the foregoing, therefore, it will be seen that in accordance with one form of the present invention, a transistor amplifier may be so operated that a load is selectively keyed into the circuit at a time subsequent to the initial occurrence of an input signal and at a time when the portion of the input signal occurring prior to keying of the load is sufficient to effect a substantially steady state current through the load comprising, at least partially, enhancement charges. The load is thereafter keyed out of the circuit, preferably at a time when the enhancement charge is substantially entirely drawn from the transistor by the load, and this key-out time may occur substantially simultaneous with the complete cessation of the input signal. By such an arrangement, therefore, and inasmuch as a given total charge is drawn out of the transistor during a time interval shorter than that allocated to the entire input signal, the transistor amplifier exhibits improved gain characteristics, which improved gain characteristics arise primarily from the utilization of the enhancement charge previously considered undesirable in the system. As will be described, a shaping pulse may be caused to occur immediately subsequent to the key-out of the load thereby to remove any residual charge from the transistor and to discharge, for instance, the collector capacity of the transistor, whereby spurious results will be prevented.

The foregoing operation will become more readily apparent from a consideration of the waveforms illustrated in Figure 2, as applied to the circuit of Figure 1. In the particular example of Figure 2, a single time interval $t1$ to $t3$ has been illustrated, and it has been assumed that this particular time interval corresponds to the time allocated to a given input pulse. Thus, referring to the waveforms of Figure 2, it will be seen that during an initial time period $t1$ to $t2$, which may comprise for instance up to one half cycle of the input signal, an input pulse applied to terminals 12 of Figure 1 may be caused to increase negatively in value thereby to inject carriers into the transistor 10. The particular waveform shown in Figure 2B has been much exaggerated and has depicted a case wherein the input signal waveform is so poor that substantially one half of the input cycle comprises the rise time of the said input signal.

During this initial time period $t1$ to $t2$ (Figure 2), the power pulses applied by source 13 may assume, for instance, a small positive value whereby rectifier D1 is maintained nonconductive, and the load $R_L$ is accordingly disconnected from the transistor 10. At time $t2$, the power pulses applied by source 13 (Figure 2A), may fall to a negative value whereby rectifier D1 and load $R_L$ will be connected to the collector of transistor 10. The load current will thus rapidly rise at time $t2$ (Figure 2C), and will be maintained at this positive value during the time interval $t2$ to $t3$, even though the input signal applied to terminals 12 should be falling to substantially zero potential during this time interval (Figure 2B). As a result the potential at output terminal 14 will approach the reference potential of the emitter of transistor 10, shown in Fig. 1 as ground, and will therefore be at zero potential between $t2$ and $t3$. This maintenance in the magnitude of load current and output voltage is effected by a drawing off of enhancement current through the load $R_L$ by the power pulses applied from source 13 during the time interval $t2$ to $t3$, and the several parameters are preferably so chosen that substantially all the enhancement charge is drawn from transistor 10 during this time interval $t2$ to $t3$. At time $t3$, at which time substantially all the enhancement charge is preferably drawn out of transistor 10, the power pulses applied by source 13 may once more assume their positive value, thereby disconnecting rectifier D1 and load $R_L$ from the transistor; and, if desired, a relatively narrow clean-up pulse may be applied by source 15 immediately subsequent to time $t3$ (Figure 2D), thereby to render rectifier D2 conductive and to rapidly draw any residual enhancement charge from the transistor 10.

In the particular example illustrated and described above, the load $R_L$ has been assumed to represent the only load coupled to transistor 10 and this load has been connected, as illustrated, via rectifier D1 to the said transistor. While an arrangement such as has been described is entirely permissible, certain modifications will be apparent. Thus, the load $R_L$ may be transformer-coupled to the circuit, for instance, in which event the rectifier D1 may be coupled to one end of a transformer primary, for instance, the other end of which primary is connected to the aforedescribed power pulse or clock pulse source. The load $R_L$ may, in such an event, be coupled to the secondary of the transformer, in which case, the load current rise between $t2$ and $t3$ previously mentioned would make the circuit a non-complementing amplifier. In addition, while it is not necessary to have any load on the output lead other than the keyed load, it may be advantageous in certain applications to utilize a return voltage on the collector of transistor 10 thereby to facilitate the charging of the output circuit. Such a return voltage may, for instance, be provided by one of the alternatives illustrated in Figures 1B, 1C and 1D; and may comprise, for instance, an R—L network 16, of Figure 1B, connected as illustrated, to a source 17 of return voltage; or a resistive network 18 of Figure 1D may be connected to such a source 17. In the alternative, the said return voltage may be coupled to the collector of transistor 10 by a resistive element 19 and a rectifier D3 as shown in Figure 1C, whereby the said return voltage may be keyed on and off by the application of suitable clock pulses to terminal 20.

While the form of the present invention described above acts essentially as a transistor amplifier, in that outputs are achieved only in response to the application of an input, the circuit may also be considered to act as a complementer utilizing an inverting amplifier. Before proceeding with the description of this particular form of the invention, it should be noted that in normal operation an inverting amplifier, such as a transistor, a vacuum tube or a carrier type magnetic amplifier, is supplied by a relatively steady state energization potential, whereby a positive-going input signal, for instance applied to the grid of a vacuum tube, results in a negative-going output signal appearing at the anode of such a vacuum tube.

In accordance with the present invention, if the steady state energization potentials normally utilized should be replaced by pulse type energization potentials, the inverting amplifier assumes a completely new function. In such a case, the input signal applied to such an inverting amplifier during the occurrence of preselected ones of the energization pulses, acts to maintain an output point at a predetermined reference potential through conduction of the inverting amplifier; while in the absence of such an input signal, and due to non-conduction of the inverting amplifier, an output point may be caused to follow the energization pulses in potential. Thus, by providing pulse type energization sources in such inverting amplifiers, for instance in transistors, pulse type outputs may be obtained at a load in the absence of signal inputs, while the presence of a signal input causes the output point to assume a predetermined potential during the occurrence of an energization pulse. The device thus acts as a complementer.

A transistor circuit, operating in the foregoing manner, once more, takes the form illustrated in Figure 1; and in such a case, output point 14 would regularly fall substantially to the negative power pulse potential in the absence of a signal input; while, in response to a signal input, the said output point, rather than following the power pulse, would remain at substantially ground potential. In such a case, and by proper choice of the utilization circuit coupled to terminal 14, the negative-going excursions of point 14 could be considered "outputs" while the voltage remaining at ground, occurring in response to a signal input, could be considered "no output."

In a modified form of the complementer circuit of Figure 1, the rectifier D1 may be eliminated and replaced by the direct connection designated 21 as shown in Figure 1A; and when this modified form of circuit is employed, the transistor 10 will once more be non-conductive in the absence of an input to terminals 12 whereby the collector 22 of transistor 10 can follow the potential of power pulses applied to terminal 13. As a result, each negative-going power pulse appearing at the terminal 13, in the absence of a signal input to the modified circuit, will, as before, effect a negative-going output pulse at the output point 14. Upon application of an input signal to the terminals 12, however, the transistor 10 will be rendered conductive during the application of each negative-going power pulse from source 13, and this conduction of the transistor 10 will cause the collector 22 to assume substantially the same potential as the emitter of the said transistor, namely ground potential, during transistor conduction whereby output point 14 will be at substantially ground potential during the occurrence of each such negative-going power pulses appearing at terminal 13.

Thus, in both the unmodified and modified forms of the invention, the substitution of a pulse type energization source for the usual steady state source alters the characteristic operation of the circuit to one wherein pulsed outputs of a desired polarity are obtained in the absence of input signals, and wherein the occurrence of a signal input rendering the transistor conductive serves to eliminate these output pulses. The devices thus act as complementers.

The foregoing operation of the modified form of the invention will become more readily apparent from a consideration of the waveforms shown in Figure 3. During a time interval *t1* to *t3*, a negative-going power pulse is applied to terminal 13 (Figure 3A). Inasmuch as no input pulse is applied to the terminals 12 (which may, for instance, comprise a plurality of buffed inputs) during the occurrence of this power pulse, the transistor 10 is non-conductive whereby the energy of the power pulse is coupled via load resistor $R_L$ to the output point 14 and the said output point 14 describes a potential excursion which corresponds to that of the power pulse source. If now, during a time interval *t4* to *t6*, an input pulse should be applied to the terminals 12, the transistor 10 will be driven into conduction. It should be noted that in the particular timing diagram illustrated in Figure 3 the input pulse, such as the one occurring during time interval *t4* to *t6*, is applied initially during a time period prior to the occurrence of a power pulse from source 13 (occurring for instance during the time interval *t5* to *t7*). thereby once more to permit the injection of carriers and to allow additional time for hole diffusion in the transistor prior to actual occurrence of a power pulse, and this overlap of signal input and power pulse actually increases the gain of the circuit.

Due to application of an input pulse during the time interval *t4* to *t6*, the transistor 10 becomes conductive upon application of a power pulse from source 13 during the time interval *t5* to *t7*, for instance. This conduction of the transistor thus causes the collector 22, and as a result the output point 14, to assume substantially the same potential as that of the transistor emitter, namely ground potential, whereby output point 14 is no longer driven negatively in response to application of a power pulse from source 13.

In the particular example illustrated in Figure 3, a small sneak pulse is shown in the output immediately subsequent to time *t5*, and coincident with the application of a power pulse from source 13; and such a sneak pulse results in practical embodiments of the invention, inasmuch as the collector of the transistor 10 is permitted to sag somewhat in an attempt to achieve as much current gain as possible. Such sneak pulses may, of course, be avoided by reducing the amplitude of the power pulse, but as a practical matter, they can be completely suppressed by the proper choice of circuit components without reducing the overall gain of the system.

In the absence of a still further input, for instance during the time interval *t8* to *t10*, the transistor 10 will once more be non-conductive during a time interval *t9* to *t11*, and a further negative-going power pulse applied from source 13 during this time interval *t9* to *t11* will once more produce a corresponding negative-going output pulse at point 14. As mentioned previously, the input signals are preferably so timed with respect to the power pulses that they begin prior to the actual beginning of a power pulse, and the said input pulses, as illustrated, terminate while the power pulse is still "on." Notwithstanding the termination of the input pulse, current continues to flow in the output mesh of the circuit during continued application of the power pulse, due to the storage of excess carriers in the lattice structure of the semiconductive material comprising the transistor, whereby the modified form of the circuit being described once more utilizes the enhancement charge phenomenon discussed previously. Thus, referring to Figures 3A and 3C, it will be seen that although the input pulse terminates at a time *t6*, the transistor 10 continues to conduct during the time interval *t6* to *t7*, at which time the power pulse is still applied; and this continued conduction results from the flow of excess carriers previously stored in the transistor.

Again, as in the embodiment discussed with reference to Figure 2, clean-up pulses may be utilized to prevent spurious results from such excess carriers, and the clean-up pulses may be of the type illustrated in Figure 3B, occurring periodically and being applied immediately subsequent to the cessation of power pulses from the source 13.

To summarize the foregoing operation of this modified form of circuit, therefore, it will be seen that the present invention provides an improved complementing amplifier comprising a load which is pulsed by a source of regularly occurring power pulses. This load is also coupled to a selectively conductive amplifier of the inverting type whereby, in the absence of a signal input and of resulting conduction of the said inverting amplifier, the power pulses are coupled to an output point; while in response to an input signal and to the resulting conduction of the inverting amplifier, the output point is maintained at a predetermined reference potential notwithstanding the presence of power pulses. The operation of the circuit thus conforms to that of a complementing amplifier; and when employing a transistor of the type shown in Figure 1, effects such complementing operation with greater current gain than has been the case heretofore. In actual practice, it has been found that by substitution of the pulse type supply 13 in Figure 1 for conventional steady state power supplies, the circuit employing transistor 10 in fact exhibits current gains of two or three times that obtained when the collector load is returned to a steady supply voltage.

Certain modifications of the circuit will be readily apparent. Arrangements such as that shown in Figure 1 readily lend themselves to direct coupled operation, and a plurality of circuits of the type shown in Figure 1 may be connected in cascade to provide various logical structures finding utility in computation devices.

Many further variations of the circuit will be suggested to those skilled in the art. The several possible forms of transistor which may be employed, as well as the several possible interconnections of such transistors with the input, with the load and with the pulse shaping or clean-up sources, have already been mentioned. In addition, it must be stressed that while the term "transistor" has been utilized above in connection with three terminal semiconductor devices, this term is meant to generically include semiconductors having three or more terminals. In accordance with this definition, therefore, it will be appreciated that the transistor tetrode or multiple emitter transistors, for instance, may be employed in amplifiers and complementers of the type contemplated herein, as may the other forms of inverting amplifiers mentioned above.

The foregoing description is, therefore, meant to be illustrative only and should not be considered limitative of my invention, and all such variations as are in accord with the principles discussed are meant to fall within the scope of the appended claims.

Having thus described my invention, I claim:

1. In a logical element, a transistor having its emitter coupled to a source of reference potential, a resistive impedance having one end connected to the collector of said transistor, a source of spaced power pulses coupled to the other end of said impedance, means applying selective control signals to the base of said transistor, and means for taking an output from said one end of said impedance, whereby said output comprises spaced pulses corresponding to said power pulses when said transistor is nonconductive, and said output corresponds substantially to said reference potential when said transistor is conductive.

2. The circuit of claim 1 wherein said reference potential comprises ground potential.

3. The circuit of claim 2 wherein said transistor is normally non-conductive, said transistor being rendered conductive in response to the presence of a control signal during the occurrence of one of said power pulses.

4. In an amplifier, the combination of a transistor having an input and output electrode, means for selectively applying spaced input signals to said input electrode at certain times, a load, rectifier means interposed between said output electrode and one end of said load, and a source of regularly occurring clock pulses coupled to the other end of said load for regularly changing the conductivity of said rectifier means at preselected times thereby to regularly connect said load to said output electrode via said rectifier means, the timing of said clock pulses being so related to the times of occurrence of said input signals that said load is operatively connected to said output electrode at first times subsequent to the times for commencement of each of said input signals, and said load is operatively disconnected from said output electrode at second times substantially coincident with the times for cessation of each of said input signals.

5. In an amplifier, the combination of a transistor having an input, an output and a common electrode, means for selectively applying spaced input signals to said input electrode at certain times, a load, rectifier means interposed between said output electrode and one end of said load, and a source of regularly occurring clock pulses coupled to the other end of said load for changing the conductivity of said rectifier means at preselected times, thereby to regularly connect said load to said output electrode via said rectifier means, the timing of said clock pulses being so related to times of occurrence of said input signal that said load is operatively connected to said output electrode of said transistor at first times subsequent to the times for commencement of each of said input signals and is operatively disconnected from said output electrode at second times corresponding to the end of said clock pulses.

References Cited in the file of this patent

UNITED STATES PATENTS

| | | |
|---|---|---|
| 2,535,303 | Lewis | Dec. 26, 1950 |
| 2,572,080 | Wallace | Oct. 23, 1951 |
| 2,594,449 | Kircher | Apr. 29, 1952 |
| 2,597,796 | Hindall | May 20, 1952 |
| 2,644,892 | Gehman | July 7, 1953 |
| 2,730,632 | Curtis | Jan. 10, 1956 |